United States Patent
Al-Mufti et al.

(10) Patent No.: US 10,230,550 B2
(45) Date of Patent: Mar. 12, 2019

(54) METHOD AND APPARATUS FOR SUCCESSIVE ORDER NONLINEAR PASSIVE INTERMODULATION DISTORTION CANCELLATION

(71) Applicant: CommScope Technologies LLC, Hickory, NC (US)

(72) Inventors: Khalid W. Al-Mufti, Sterling, VA (US); Thomas B. Gravely, Herndon, VA (US); Ariful Hannan, Sterling, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/759,497

(22) PCT Filed: Nov. 18, 2016

(86) PCT No.: PCT/US2016/062817
§ 371 (c)(1),
(2) Date: Mar. 12, 2018

(87) PCT Pub. No.: WO2017/091468
PCT Pub. Date: Jun. 1, 2017

(65) Prior Publication Data
US 2018/0262370 A1     Sep. 13, 2018

Related U.S. Application Data

(60) Provisional application No. 62/259,901, filed on Nov. 25, 2015.

(51) Int. Cl.
*H04L 25/02* (2006.01)
*H04L 25/03* (2006.01)
*H04B 1/10* (2006.01)

(52) U.S. Cl.
CPC ............ *H04L 25/03* (2013.01); *H04B 1/10* (2013.01); *H04L 25/02* (2013.01); *H04L 25/0252* (2013.01)

(58) Field of Classification Search
CPC ...... H04B 1/0475; H04B 1/10; H04B 1/1081; H04B 1/12; H04B 1/123; H04B 1/126;
(Continued)

(56) References Cited

U.S. PATENT DOCUMENTS

2013/0044791 A1*   2/2013   Rimini ............... H04B 1/109
                                                                                                    375/219
2013/0310090 A1   11/2013   Bevan et al.
(Continued)

FOREIGN PATENT DOCUMENTS

KR           101378370 B1      3/2014

OTHER PUBLICATIONS

Hannan et al, "Interference Detection and Identification in Wireless Network from RF or Digitized Signal", "U.S. Appl. No. 15/691,615, filed Aug. 30, 2017", Aug. 30, 2017, pp. 1-42.
(Continued)

*Primary Examiner* — Young T Tse
(74) *Attorney, Agent, or Firm* — Fogg & Powers LLC

(57) ABSTRACT

A method for diminishing passive intermodulation (PIM) is provided. The method comprises: upsampling an uplink baseband modulated signal; upsampling a downlink baseband modulated signal; determining a time delay for the upsampled downlink baseband modulated signal; time delaying the upsampled downlink baseband modulated signal by the determined time delay; estimating a third order PIM distortion (PIMD) product by filtering the time delayed, upsampled downlink baseband modulated signal with a third order power series kernel; generating a first filtered signal by subtracting the estimated third order PIMD product from the
(Continued)

upsampled downlink baseband modulated signal; estimating a Nth order PIMD product by filtering the time delayed, upsampled downlink baseband modulated signal with a Nth order power series kernel; generating a nth filtered signal by subtracting the estimated Nth order PIMD product from the n−1th filtered signal; and downsampling the nth filtered signal.

20 Claims, 9 Drawing Sheets

(58) Field of Classification Search
CPC .......... H04B 1/1661; H04B 1/38; H04B 1/40; H04B 1/50; H04L 25/03; H04L 25/03019; H04L 25/03025; H04L 25/03821; H04L 25/03828; H04L 25/08; H04L 25/085; H04L 25/02; H04L 25/0252
USPC ....... 375/144, 219, 220, 222, 254, 285, 296, 375/346, 350; 455/500, 501, 63.1, 67.13, 455/73
See application file for complete search history.

(56) References Cited

U.S. PATENT DOCUMENTS

| | | |
|---|---|---|
| 2014/0036736 A1 | 2/2014 | Wyville |
| 2014/0036969 A1* | 2/2014 | Wyville ................... H04B 1/38 375/219 |
| 2015/0078226 A1* | 3/2015 | Charlon ................. H04B 1/525 370/290 |
| 2015/0098521 A1 | 4/2015 | Beidas et al. |
| 2015/0223083 A1 | 8/2015 | Maca et al. |
| 2015/0244414 A1* | 8/2015 | Yu .......................... H04B 1/525 455/73 |
| 2015/0333784 A1 | 11/2015 | Bevan et al. |

OTHER PUBLICATIONS

International Searching Authority, "International Search Report and Written Opinion for PCT Application No. PCT/US2016/062817", Foreign Counterpart to U.S. Appl. No. 62/259,901, dated Feb. 20, 2017, pp. 1-11, Published in: WO.

Matthews, John V., "Adaptive Polynomial Filters", "IEEE SP Magazine", Jul. 1991, pp. 10-26, Publisher: IEEE.

Nollet et al, "Nonlinear Echo Cancellation for Hands-free Speakerphones", Proc. NSIP 1997 (Nonlinear Signal and Image Processing), Michigan, USA, Sep. 8-10, 1997. pp. 1-5.

Stenger et al, "Adaptive Volterra Filters for Nonlinear Acoustic Echo Cancellation", Proc. NSIP '99 (Nonlinear Signal and Image Processing), Antalya, Turkey, Jun. 20-23, 1999. pp. 1-5.

Wilkerson, Jonathan Ryan, "Dissertation submitted to the Graduate Faculty of North Carolina State University—"Passive Intermodulation Distortion in Radio Frequency Communication Systems"", Dated 2010, pp. 1-309, Publisher: Jonathan Ryan Wilkerson.

* cited by examiner

METHOD AND APPARATUS FOR SUCCESSIVE ORDER NONLINEAR PASSIVE INTERMODULATION DISTORTION CANCELLATION

CROSS-REFERENCED TO RELATED APPLICATIONS

This application claims priority to International Patent Application Serial No. PCT/US2016/062817 filed on Nov. 18, 2016 which claims the benefit of provisional U.S. Patent Application Ser. No. 62/259,901 filed Nov. 25, 2015; both applications are incorporated herein by reference in their entirety.

BACKGROUND

A traditional monolithic RF base transceiver station (BTS) architecture is increasingly being replaced by a distributed BTS architecture in which the functions of the BTS are separated into two physically separate units—a baseband unit (BBU) and a remote radio head (RRH). The BBU performs baseband processing for the particular air interface that is being used to wirelessly communicate over the RF channel. The RRH performs radio frequency processing to convert baseband data output from the BBU to radio frequency signals for radiating from one or more antennas coupled to the RRH and to produce baseband data for the BBU from radio frequency signals that are received at the RRH through one or more antennas.

The RRH is typically installed near the BTS antenna(s), often at the top of a tower, and the BBU is typically installed in a more accessible location, often at the bottom of the tower. The BBU and the RRH are typically connected through one or more fiber optic links. The interface between the BBU and the RRH is defined by front-haul communication link standards such as the Common Public Radio Interface (CPRI) family of specifications, the Open Base Station Architecture Initiative (OBSAI) family of specifications, and the Open Radio Interface (ORI) family of specifications.

Wireless operators are under constant pressure to increase the speed, capacity and quality of their networks while reducing operating costs. As technologies evolve, that challenge is becoming increasingly difficult. One specific reason is that passive intermodulation (PIM) distortion products in an uplink band in an uplink path are having a more noticeable, detrimental effect on network performance, and thus are increasing network costs.

Intermodulation distortion (IMD) products are spurious signals in the uplink path, i.e. in an operating band of a receiver. Interference caused by IMD products decreases the sensitivity, and hence the dynamic range of the receiver. IMD products may be caused by active and passive sources, e.g. components of a transceiver system. The IMD products of active components in the transceiver system can be suppressed by techniques such as feed-forward linearization. However, PIM distortion (PIMD) products cannot be so removed.

PIMD is caused by nonlinearities in passive components arising from metal to metal contacts, and metal to insulator to metal contacts. For example, PIMD occurs at the metal to metal interfaces in antennas, cables and/or transceiver components. Sources of PIMD can also be found in nearby metal objects such as guy wires, anchors, roof flashings, and pipes. Also, rust, corrosion, loose connections, dirt, and oxidation may give rise to PIMD. Advanced wireless equipment requires increased dynamic range including higher sensitivity. The dynamic range and sensitivity of new technologies, like the Long Term Evolution (LTE) cellular networks, are limited by PIMD levels. For example, a 1 decibel drop in uplink sensitivity due to PIMD in the uplink band can reduce cell coverage by as much as 11 percent. Therefore, there is a need in the art for a technique to effectively and efficiently reduce PIMD to improve wireless equipment performance.

SUMMARY OF THE INVENTION

A method for diminishing passive intermodulation (PIM) is provided. The method comprises: upsampling an uplink baseband modulated signal; upsampling a downlink baseband modulated signal; determining a time delay for the upsampled downlink baseband modulated signal; time delaying the upsampled downlink baseband modulated signal by the determined time delay; estimating a third order PIM distortion (PIMD) product by filtering the time delayed, upsampled downlink baseband modulated signal with a third order power series kernel; generating a first filtered signal by subtracting the estimated third order PIMD product from the upsampled downlink baseband modulated signal; estimating a Nth order PIMD product by filtering the time delayed, upsampled downlink baseband modulated signal with a Nth order power series kernel; generating a nth filtered signal by subtracting the estimated Nth order PIMD product from the n−1th filtered signal; and downsampling the nth filtered signal.

DRAWINGS

DETAILED DESCRIPTION

Embodiments of the present invention provide a technique to reduce passive intermodulation distortion (PIMD) products, e.g. in the transceiver system. Advantageously, embodiments of the present invention enable reduction of PIMD products, and thus increase the operating range of the transceiver system. One benefit of the invention is that fewer transceiver systems can be used to implement radio networks such as cellular networks.

In one embodiment, such PIMD products can be caused by the mixing of a desired signal to be received, and an interferer signal. In another embodiment, the interferer signal can be the signal transmitted by a transceiver system's transmitter or downlink path.

Figure 1:
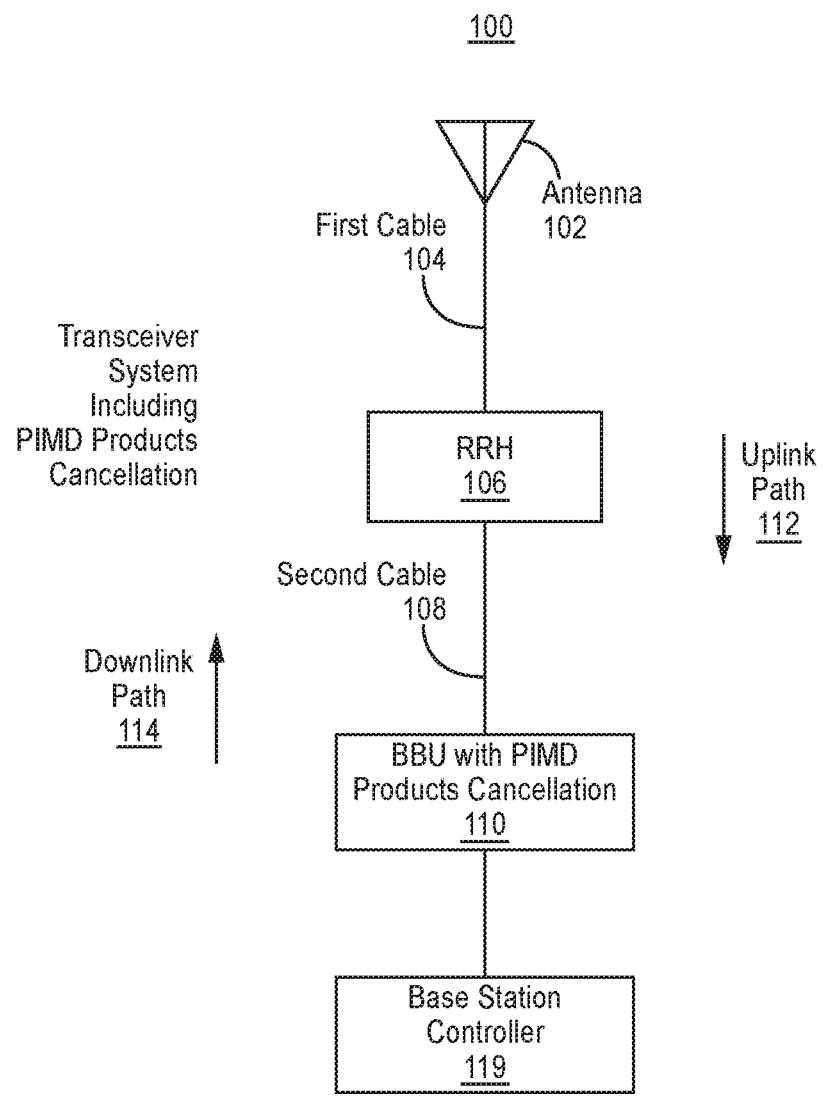
FIG. 1 illustrates a block diagram of an exemplary embodiment of a transceiver system including PIMD products cancellation.

FIG. 1 illustrates a block diagram of an exemplary embodiment of a transceiver system including PIMD products cancellation 100. In this embodiment, the transceiver system including PIMD products cancellation 100 includes an antenna 102 coupled to a RRH 106 by a first cable 104. In one embodiment, the antenna 102 is a dipole or dipole array. In another embodiment, the first cable 102 is coaxial cable such as Heliax® cable.

The RRH 106 is coupled to a BBU with PIMD products cancellation 110 by a second cable 108. In one embodiment, the second cable 108 is a fiber optic cable. In another embodiment, PIMD products can originate in the antenna, cables, RRH 106, and/or any other transceiver system component.

In one embodiment, the BBU with PIMD products cancellation 110 is coupled to a base station controller 119. The base station controller controls one or more transceiver systems, and performs radio network management, such as radio frequency control, and transceiver system handover management and call setup.

In one embodiment, the transceiver system including PIMD products cancellation 100 modulates, upconverts, amplifies and transmits a transmitted signal in a downlink path 114. The transceiver system including PIMD products cancellation 100 receives, amplifies, downconverts and demodulates a received signal in an uplink path 112. In another embodiment, the transceiver system including PIMD products cancellation 100 also diminishes PIMD products arising in the uplink path 112.

Figure 2:
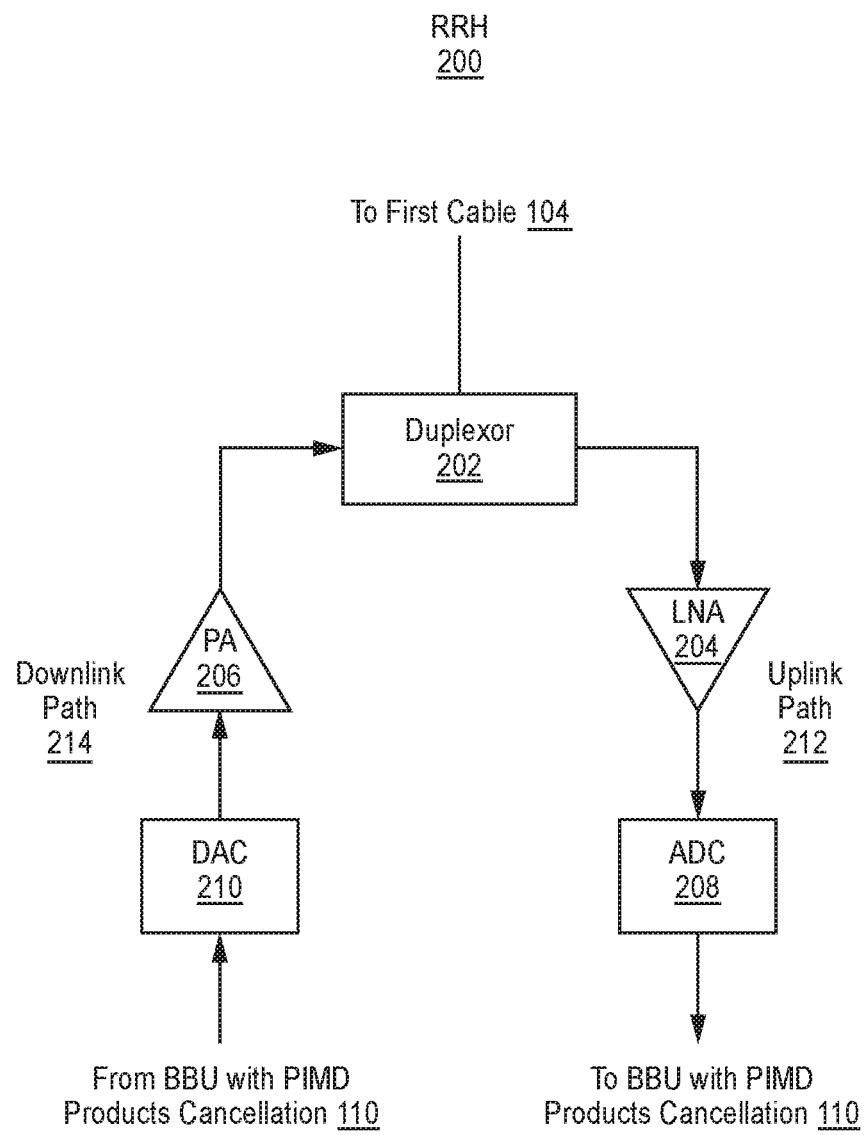
FIG. 2 illustrates an exemplary embodiment of an RRH.

FIG. 2 illustrates an exemplary embodiment of an RRH 200. In this embodiment, the RRH 106 includes a duplexor 202 that couples an uplink path 212 and a downlink path 214 to the antenna 102, e.g. through a first cable 104. The duplexor 202 also isolates the uplink path 212 and a downlink path 214 from one another. The uplink path 212 of the RRH 200 comprises a low noise amplifier (LNA) 204 whose output is coupled to an input of an analog to digital converter (ADC) 208. The input of the LNA 204 is coupled to the duplexor 202.

The output of the ADC 208 is coupled to the BBU with PIMD products cancellation 110. In another embodiment, the uplink path 212 may also include a digital downconverter (DDC). In a further embodiment, as will be subsequently illustrated, the BBU with PIMD products cancellation 110 includes the digital downconverter.

In one embodiment, the low noise amplifier 204 has sufficiently low noise figure and high gain to establish a low white noise floor for the uplink path 212. Ideally, this would increase the sensitivity of the transceiver system including PIMD products cancellation 100. However, IMD products such as from PIM can undermine this benefit.

The downlink path 214 of the RRH 200 comprises a digital to analog converter (DAC) 210 whose output is coupled to an input of a power amplifier (PA) 206. The output of the power amplifier 206 is coupled to the duplexer 202. The input of the DAC 210 is coupled to the BBU with PIMD products cancellation 110. In another embodiment, the downlink path 214 may also include a digital upconverter (DUC). In a further embodiment, as will be subsequently illustrated, the BBU with PIMD products cancellation 110 includes the digital upconverter.

Figure 3A:
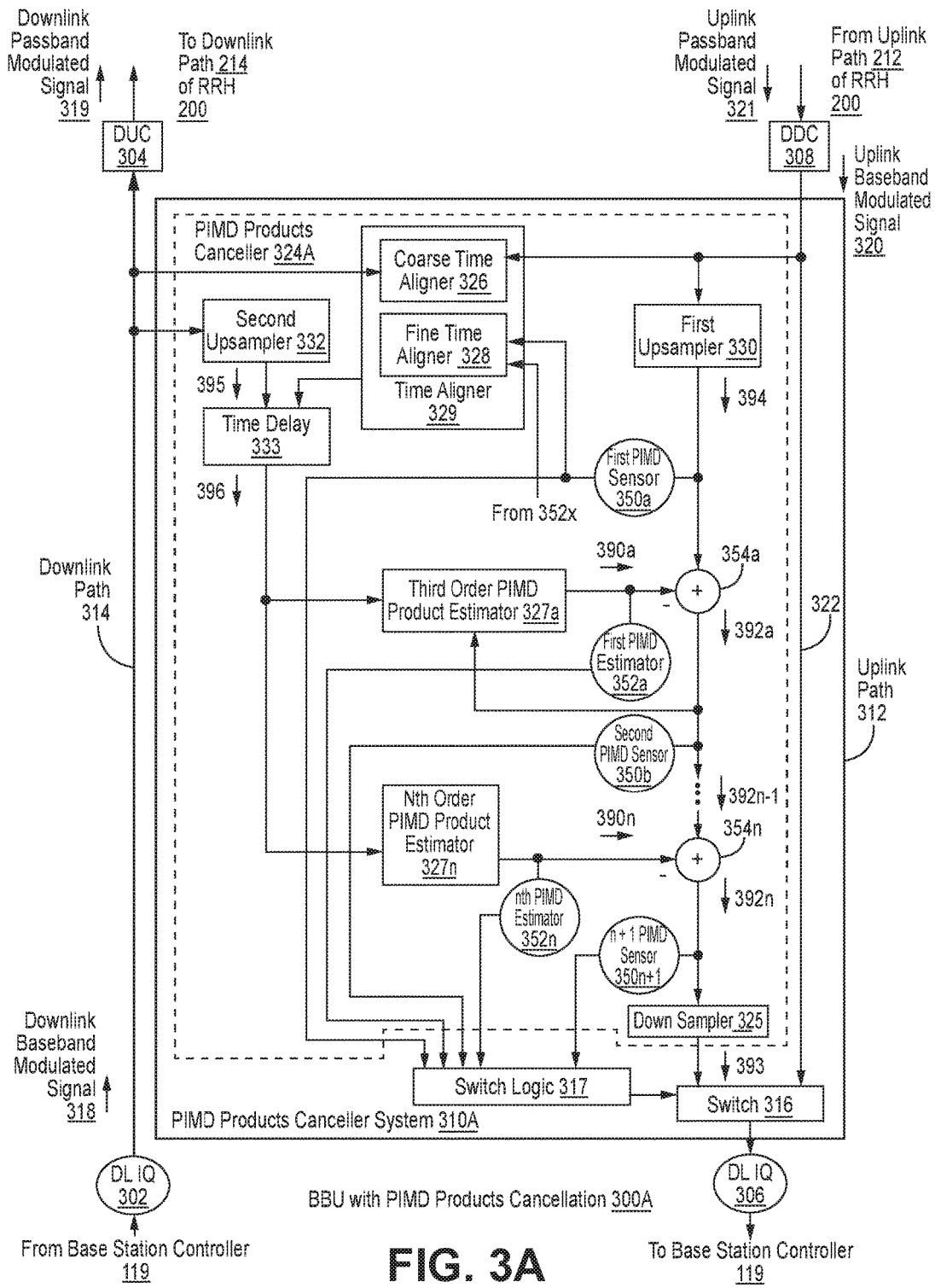
FIG. 3A illustrates an exemplary embodiment of a BBU with intermodulation distortion products cancellation.

FIG. 3A illustrates an exemplary embodiment of a BBU with PIMD products cancellation 300, which will be subsequently described. In this embodiment, the BBU with PIMD products cancellation 300 includes an uplink path 312 and a downlink path 314 which are respectively coupled to the uplink path 212 and downlink path 214 of the RRH 200.

In one embodiment, the downlink path 314, of the BBU with PIMD products cancellation 300, includes a downlink IQ modulator (DL IQ) 302 coupled to a direct upconverter (DUC) 304. The IQ modulator 302 modulates data, e.g. with quadrature amplitude or phase modulation, and provides a downlink baseband modulated signal 318. The direct upconverter 304 converts the downlink baseband modulated signal 318 to a downlink passband modulated signal 319, e.g. at the carrier frequency at which the data is to be broadcast. The output of the direct upconverter 304 and the downlink passband modulated signal 319 are configured to be coupled to the downlink path 214 of the RRH 200, e.g. through the digital to analog converter 210. In another embodiment, the downlink path 314, e.g. through the downlink IQ modulator 302, is configured to be coupled to the base station controller 119.

In one embodiment, the uplink path 312, of the BBU with PIMD products cancellation 300, includes an uplink IQ demodulator (UL IQ) 306 coupled, through a PIMD products canceller system with power series kernels (PIMD products canceller system) 310A, to a direct downconverter (DDC) 308. The direct downconverter 308 downcoverts an uplink passband modulated signal 321, from the carrier frequency to baseband, providing an uplink modulated baseband signal 320. The input of the direct downconverter 308 is configured to be coupled to the uplink path 212 of the RRH 200, e.g. through the analog to digital converter 208, and to receive the downlink passband modulated signal 319 therefrom.

In another embodiment, the IQ demodulator 306 demodulates data from the uplink modulated baseband signal 320, e.g. with quadrature amplitude or phase demodulation, and provides downconverted, demodulated data. In a further embodiment, as will be subsequently described, the uplink baseband modulated signal 320 is subject to signal processing prior to being demodulated by the uplink IQ demodulator 306. In yet another embodiment, the uplink path 312, e.g. through the uplink IQ modulator 306, is configured to be coupled to the base station controller 119.

In one embodiment, the PIMD products canceller system 310A includes a PIMD products canceller with power series kernels (PIMD products canceller) 324A, a first path 322, a switch 316, and switch logic 317. In another embodiment, the PIMD products canceller 324A and the first path 322 are coupled in parallel between the digital downconverter 308 and the switch 316. In a further embodiment, the switch logic 317 is coupled to the switch 316 and the PIMD products canceller 324A as will be subsequently described. In yet another embodiment, the first path 322 provides a direct connection between the output of the direct downconverter 308 and the switch 316.

The PIMD products canceller 324A cancels successively higher orders of PIMD products, commencing with the lowest order PIMD product. This is because the power of PIMD products declines as order increases. By canceling the PIMD products from lower to higher order, it is easier to estimate a next higher order PIMD product to be canceled, and thus easier to implement a canceler that cancels each successive higher order PIMD products.

In one embodiment, the PIMD products canceller 324A comprises a time aligner 329, a first upsampler 330, a second upsampler 332, a time delay 333, a third order PIMD product estimator with a third order power series kernel (third order PIMD product estimator) 327a through a Nth order PIMD product estimator with a Nth order power series kernel (Nth order PIMD product estimator) 327n (where N is an odd integer greater than three, and n is the number of PIMD product estimators), n+1 PIMD sensors 350a . . . n+1, and n PIMD estimators 352a . . . n.

In one embodiment, the power series kernels are embodiments of finite impulse response filters. In another embodiment, as will be subsequently described, the PIMD products canceller with power series kernels 324A is a PIMD products canceller with truncated Volterra series kernels where each of the constituent PIMD product estimators 327a . . . n has a truncated Volterra series kernel.

At a minimum, N equals three, where only one PIMD products estimator is employed. The number of PIMD product estimators depends upon the power levels of PIMD products, e.g. relative to the power levels of the uplink passband modulated signal 321 and the white noise floor. The number of PIMD product estimators in the BBU with PIM cancellation 300 is selected by the designer of the BBU with PIM cancellation 300 or the architect of the communications network employing the transceiver system including PIM cancellation 100 who make a determination as to the magnitude of the deleterious effect of higher order PIMD products and the ability of the PIMD products canceller 324A to remove them.

The first upsampler 330 is coupled to and the uplink path 312 and the output of the direct downconverter 308, and is configured to receive the uplink baseband modulated signal 320. The second upsampler 332 is coupled to the downlink path 314 and the output of the downlink IQ modulator 302, and is configured to receive the downlink baseband modulated signal 318. In one embodiment, the uplink baseband modulated signal 320 and the downlink baseband modulated signal 318 are upsampled at the same rate. In another embodiment, the uplink baseband modulated signal 320 and the downlink baseband modulated signal 318 are upsampled from two to four times of their normal sample rate, e.g. specified by the air interface specification.

The uplink baseband modulated signal 320 and downlink baseband modulated signal 318 have a sampling rate defined by the air interface of the transceiver system including PIMD product cancellation 100. The first upsampler 330 and the second upsampler 332 increase the sample rate of those respective signals so that the PIMD products canceller 324A can more finely align those signals in time, and thus more effectively diminish PIMD products in the uplink baseband modulated signal 320.

The time aligner 329 estimates the time delay from the source of the PIMD products to the BBU with PIMD products cancellation 300A. In one embodiment, the time aligner 329 includes a coarse time aligner 326 and a fine time aligner 328. The coarse time aligner 326 estimates a coarse time alignment based upon signals that are not upsampled, as will be further described subsequently. In another embodiment, the coarse time aligner 326 is coupled to the output of the downlink IQ modulator 302 and the output of the direct downconverter 308, and is configured to respectively receive the downlink baseband modulated signal 318 and the uplink baseband modulated signal 320.

The fine time aligner 328 estimates a finer time alignment based upon the upsampled signals, as will be further describe subsequently. In one embodiment, the finer time alignment refines, or modifies, the coarse time alignment. In another embodiment, the fine time aligner 328 is coupled to (a) an output of the first upsampler 330 and is configured to receive the upsampled, uplink baseband modulated signal 394 and (b) an output of a PIMD estimator 352x which generates a signal indicative of the level distortion in a corresponding estimated PIMD product. In a further embodiment the PIMD estimator is the first PIMD estimator 352a which generates a signal indicative of the level of distortion in an estimated third order PIMD product. However, alternatively, the fine time aligner 328 can be coupled to another, higher order PIMD estimator which generates a signal indicative of a level of distortion in of a higher order PIMD product, e.g. a fifth or seventh order PIMD product.

The PIMD sensors and the PIMD estimators generate signals indicative of levels of distortion. In one embodiment, the signal indicative of the level of distortion is a peak to average power ratio (PAPR). PAPR is measured peak absolute amplitude power of a signal divided by time averaged measured root mean square (RMS) power of the signal. Further, the levels of PAPR generated from corresponding PIMD sensors and PIMD estimators, e.g. the first PIMD sensor 350a and the first PIMD estimator 352a should be correlated. Also, typically, with no IMD, the uplink path 312 normally has relative low PAPR.

The time aligner 329 is configured to provide, to the time delay 333, the estimated time delay by which the upsampled downlink baseband modulated signal 395 should be delayed prior to being provided to the PIMD product estimators. The output of the time aligner 329 is coupled to a first input of the time delay 333 which is programmed to have the time delay estimated by the time aligner 329. The output of the second upsampler 332 is coupled to a second input of the time delay 333. The time delay 333 delays the upsampled downlink baseband modulated signal 395 by the estimated time delay. The output of the time delay 333 is coupled to the inputs of the third order PIMD product estimator with the third order power series kernel (third order PIMD product estimator) 327a through the Nth order PIMD product estimator with the Nth order power series kernel (Nth order PIMD product estimator) 327n. Thus, the inputs of each of the PIMD product estimators are configured to receive a time delayed, upsampled downlink baseband modulated signal 396 from the output of the time delay 333.

As illustrated in FIG. 3A, each PIMD product estimator has an output coupled to a corresponding PIMD estimator and a corresponding (negative input) of a subtractor. The PIMD products canceller 324A is configured to successively remove higher order PIMD products from the upsampled, uplink baseband modulator signal 394.

The first PIMD sensor 350a and the positive input of the first subtractor 354a are coupled to output(s) of the first upsampler 330, and are thus configured to receive the upsampled, uplink baseband modulated signal 394. An output of the third order PIMD product estimator 327a is coupled to the negative input of the first subtractor 354a, and to the input of a first PIMD estimator 352a. The output of the first subtractor 354a is coupled to one or more sets of similarly configured PIMD sensors, subtractors, PIMD product estimators, and PIMD estimators. More specifically, the output of the first subtractor 354a is coupled to a second PIMD sensor 350b and the positive input of the second subtractor, and is configured to provide a first filtered signal 392a.

The output of the final subtractor, i.e. the nth subtractor 354n, is coupled to a n+1 PIMD sensor 350n+1 and an input of a downsampler 325. The downsampler 325 downsamples the nth filtered signal 392n (i.e. the upsampled, uplink baseband modulated signal which has had PIMD products diminished by the PIMD products canceller 324A) to the sampling rate of uplink baseband modulated signal 320.

A first input of the switch 316 is coupled to the output of the downsampler 325, and is configured to receive the downsampled, nth filtered signal (uplink baseband modulated signal with diminished PIMD products) 393. The first path 322 is coupled to a second input of the switch 316. The output of the switch logic 317 is coupled to a third input of the switch 316. In one embodiment, the outputs of one or more PIMD sensors and the outputs of one or more PIMD estimators are respectively coupled to inputs of the switch logic 317.

Figure 3B:
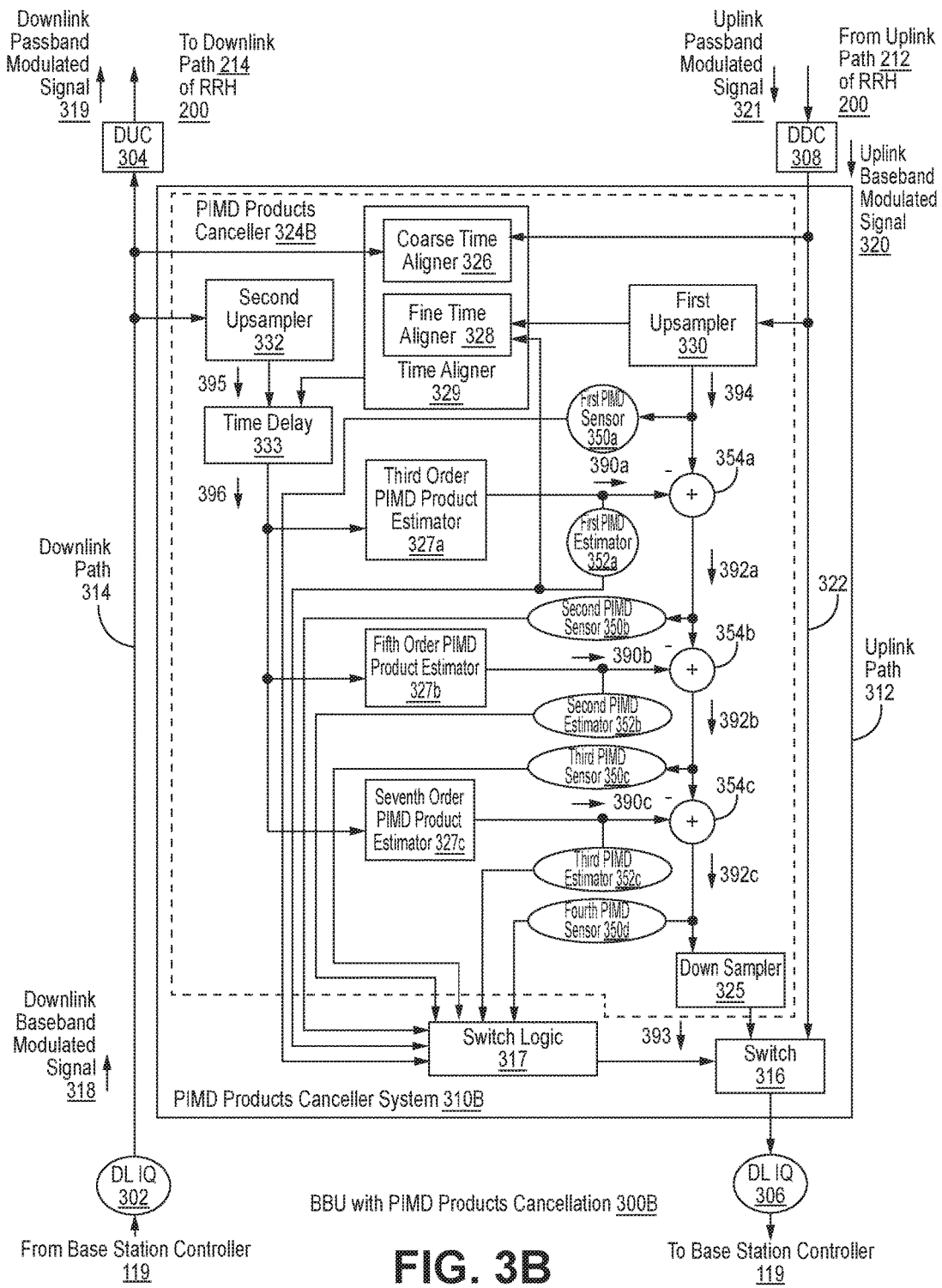
FIG. 3B illustrates another exemplary embodiment of a BBU with PIMD products cancellation.

FIG. 3B illustrates another exemplary embodiment of a BBU with PIMD products cancellation 300B. The BBU with PIMD products cancellation 300B is identical to the BBU with intermodulation distortion products cancellation 300A illustrated in FIG. 3A, except that it is implemented with seventh order PIMD cancellation. A PIMD products canceller system with power series kernels (PIMD products canceller system) 310B has three PIMD product estimators:
- a third order PIMD product estimator with third order power series kernel 327a;
- a fifth order PIMD product estimator with fifth order power series kernel 327b; and
- a seventh order PIMD product estimator with seventh order power series kernel 327c.

In one embodiment, one or more of these PIMD product estimator, e.g. third, fifth and seventh PIMD product estimators, are implemented with a power series that is a truncated Volterra series.

As further illustrated in FIG. 3B, the PIMD products canceller system with power series kernels 310B also has (in a configuration similar to FIG. 3A):
- the first PIMD sensor 350a, the second PIMD sensor 350b, a third PIMD sensor 350c, and a fourth PIMD sensor 350d, each of which is coupled to respective inputs and outputs of subtractors as illustrated in FIG. 3B;
- the first PIMD estimator 352a, a second PIMD estimator 352b, and a third PIMD estimator 350c, each of which is coupled to outputs of respective PIMD product estimators as illustrated in FIG. 3B; and
- the first subtractor 354a, a second subtractor 354b, and a third subtractor 354c each of which is coupled to an output of a respective PIMD product estimator as further illustrated in FIG. 3B.

The PIMD products canceller system with power series kernels 310B generates:
- a third order PIMD product 390a, a fifth order PIMD product 390b, a seventh order PIMD product 390c, each of which is generated at the output of the respective PIMD product estimator; and
- a first filtered signal 392a, a second filtered signal 392b, and a third filtered signal 392c, each of which is generated at the output of a respective subtractor.

Figure 3C:
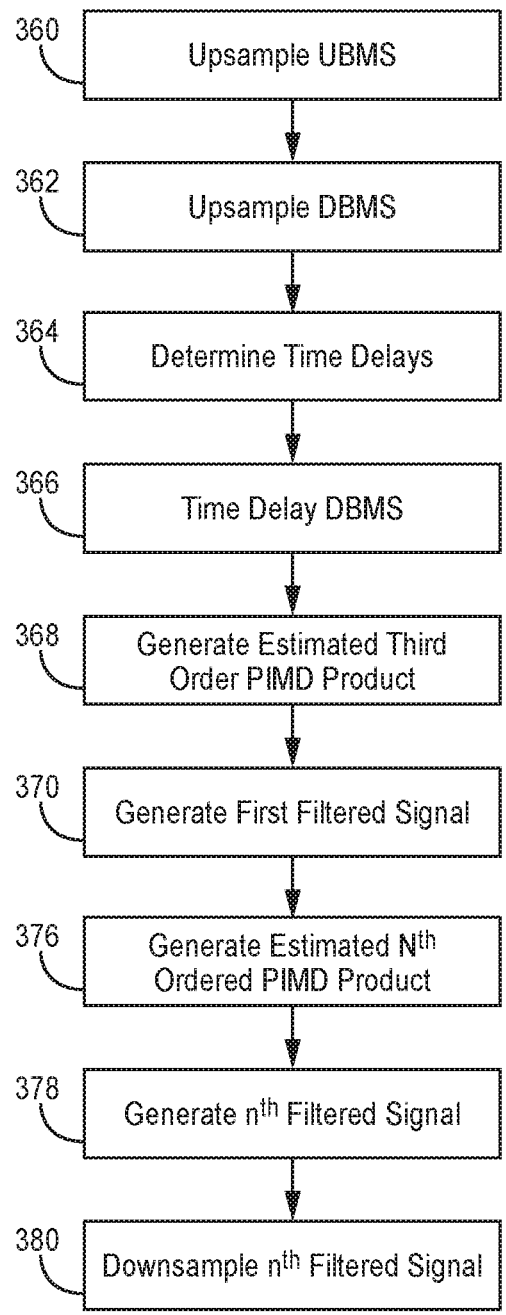
FIG. 3C illustrates an exemplary method of operation of a PIMD products canceller with power series kernels.

FIG. 3C illustrates an exemplary method of operation of a PIMD products canceller with power series kernels 324A. In block 360, upsample the uplink baseband modulated signal (UBMS), e.g. with the first upsampler 330. In block 362, upsample the downlink baseband modulated signal (DBMS), e.g. with the second upsampler 332. In block 364, determine a time delay for the upsampled downlink baseband modulated signal 395. In block 366, time delay the upsampled downlink baseband modulated signal 395 by the determined time delay. In one embodiment, the time delayed, upsampled downlink baseband modulated signal 396 is provided to each PIMD product estimator. In block 368, estimate the third order PIMD product 390a by filtering the time delayed, upsampled downlink baseband modulated signal 396 with a third order power series kernel.

In block 370, generate a first filtered signal 392a by subtracting the estimated third order PIMD product 390a from the upsampled uplink baseband modulated signal 394. In one embodiment, the first filtered signal 392a is the upsampled, uplink baseband modulated signal 394 with no or substantially no third order PIMD product. In block 376, estimate a Nth order PIMD product 390n by filtering the time delayed, upsampled downlink baseband modulated signal with a Nth order power series kernel. In block 378, generate a nth filtered signal 392n by subtracting the estimated Nth order PIMD product 390n from the n−1th filtered signal 392n-1. In one embodiment, the nth filtered signal 392b is the upsampled, uplink baseband modulated signal 394 with no or substantially no third through Nth order PIMD products. In block 380, downsample the nth filtered signal, e.g. to the sampling rate of the air interface of the transceiver system including PIMD product cancellation 100. In another embodiment, the first and Nth order power series are first and Nth order Volterra series.

In one embodiment of the method, for a seventh order PIMD estimator also: estimate a fifth order PIMD product 390b by filtering the time delayed, upsampled downlink baseband modulated signal 396 with a fifth order power series kernel; generate a second filtered signal 392b by subtracting the estimated fifth order PIMD product 390b from the first filtered signal 392a; estimate a seventh order PIMD product 390c by filtering the time delayed, upsampled downlink baseband modulated signal 396 with a seventh order power series kernel; and generate a third filtered signal 392c by subtracting the estimated seventh order PIMD product 390b from the second filtered signal 392a.

In block 376, the Nth order PIMD product 390n is a seventh order PIMD product 390c and the Nth order power series kernel is a seventh order power series kernel. In block 378, the nth filtered signal 392 is the third filtered signal 392c, the estimated Nth order PIMD product 390n is the estimated seventh order PIMD product 390c, and the n−1th filtered signal 392n-1 is the second filtered signal 392b.

One embodiment of the time aligner 329 and block 364 will now be further described. The time aligner 329 determines how long the samples of the upsampled downlink baseband modulated signal 395 need to be delayed prior to being provided to the PIMD estimators. The time aligner 329, e.g. the coarse time aligner 326, receives the downlink baseband modulated signal 318 and the uplink baseband modulated signal 320 sampled at the rate defined by their air interface such as LTE. The time aligner 329 performs a coarse estimate of the delay between those two signals to determine the distance from the source of PIMD products and the RRH 106. In one embodiment, the downlink baseband modulated signal 318 coupled to the time aligner 329, e.g. the coarse time aligner 326, arrives at the time aligner 329, e.g. the coarse time aligner 326, several hundred sample times prior to the corresponding uplink baseband modulated signal 320.

In one embodiment, the coarse delay time, is an estimate of the time delay from the source of PIM distortion products. In another embodiment, the coarse delay time is obtained with a calibration process, further described below, e.g. when the transceiver system including PIMD product cancellation 100 is being maintained, and not being used for normal operation. The coarse alignment time delay data is then stored in a look up table, e.g. in memory in the time aligner 329 or coarse time aligner 326, to provide a coarse time delay to be used to align, e.g. of the upsampled downlink baseband modulated signal 395. The calibration process and apparatus is further disclosed in provisional U.S. Patent Application Ser. No. 62/396,970 filed Sep. 19, 2016, which is incorporated herein by reference in its entirety.

One embodiment of the calibration process shall now be described. Coarse alignment delay data may be obtained using a relatively low sampling rate in the RRH 106, and a three-step process to determine the distance to the source of the PIMD products from the BBU with PIMD products cancellation 300A. First, a test signal, e.g. having good correlation properties such as a chirp signal, a PN sequence, or a Zadoff-Chu sequence, is transmitted in the downlink path 114 to determine a very coarse timing estimation of an arrival of the signal at the BBU with PIMD products cancellation 300A. Second, further test signals are transmitted to generate an estimation of relative timing PIMD products. At this second step, the signal power level for the test signal is sufficiently low so that no saturation occurs in RRH 106 (neither in the power amplifier 206 nor in the digital to analog converter 202), and thus only the PIMD products will be reflected back to the RRH 106. The delay, or relative timing, of the PIMD products' reflection is estimated. Finally, additional test signals are transmitted with power levels that saturate circuitry in the RRH 106 (e.g., either the power amplifier 206 or the digital to analog converter 202). These test signals generate active and passive IMD products' reflections. At this stage, both active IMD, and PIMD products' reflections arrive at the RRH 106. An algorithm eliminates the PIMD products' reflections during active IMD product reflection extraction. Once the PIMD products' reflections are eliminated, the active IMD product delay, or relative timing, is estimated. Finally, the difference between both the active IMD and PIMD relative timing is used to determine a coarse delay time for the upsampled downlink baseband modulated signal 395.

The time aligner 329, e.g. the fine time aligner, must still ascertain a finer time delay of the upsampled signals. This is to ensure that estimated PIMD products generated by each PIMD product canceller are aligned in time with the upsampled, uplink baseband modulated signal 394 from which the estimated PIMD products are being subtracted. In one embodiment, the time aligner 329, e.g. the fine time aligner, provides adjusts the coarse time delay so that is accurate within ±2 samples at the upsampled rate.

In one embodiment, the course delay time is accurate to within tens of samples, for example ±10 samples (at the upsampled data rate). In another embodiment, the fine time aligner only delays the downlink baseband modulated signal 318 by a number of samples that range between 0 and $+D_{MAX}$ samples where, e.g. $D_{MAX}=20$ samples.

In one embodiment, the fine time aligner determines a fine time delay, d(n) based upon the following equation:

$$d(n)=d(n-1)+f(\Delta(n)_{PAPR},d)$$

One embodiment of $f(\Delta(n)_{PAPR}, d)$ is the following:

$$f(\Delta(n)_{PAPR}) = \begin{cases} K*\exp(-\beta\Delta(n)_{PAPR}) + K_1 * \frac{\left(\Delta(n)_{PAPR} - \Delta(n-1)_{PAPR}\right)}{d(n) - d(n-1)}, & \text{if } d(n) \neq d(n-1) \\ K*\exp(-\beta\Delta(n)_{PAPR}) + K_1 * \frac{\left(\Delta(n)_{PAPR} - \Delta(n-1)_{PAPR}\right)}{\epsilon}, & \text{if } d(n) = d(n-1) \end{cases}$$

where n is a sample time, E is an arbitrary, small positive number, e.g. 0.1, $\Delta(n)_{PAPR}$ is an absolute value of the difference between a measured PAPR at the output of the upsampler 330, $PAPR_n(n)$, and a measured PAPR at the output of a PIMD product estimator, $PAPR_{n+1}(n)$, and d(n) is limited to no more than $+D_{MAX}$.

In one embodiment, $PAP_{Rn}(n)$ is measured by the first PIMD sensor 350a. In a further embodiment, $PAP_{Rn+1}(n)$ measured by a PIMD estimator, e.g. the first PIMD estimator 352a at the output of the third order PIMD product estimator. However, PAPR may be measured at the output of any other PIMD estimator associated with a higher order PIMD product estimator. The final time delay is generated by the time aligner 329 by adjusting the coarse time delay with the fine time delay to determine the delay time to be provided to, and with which to program, the time delay 333.

Figure 4A:
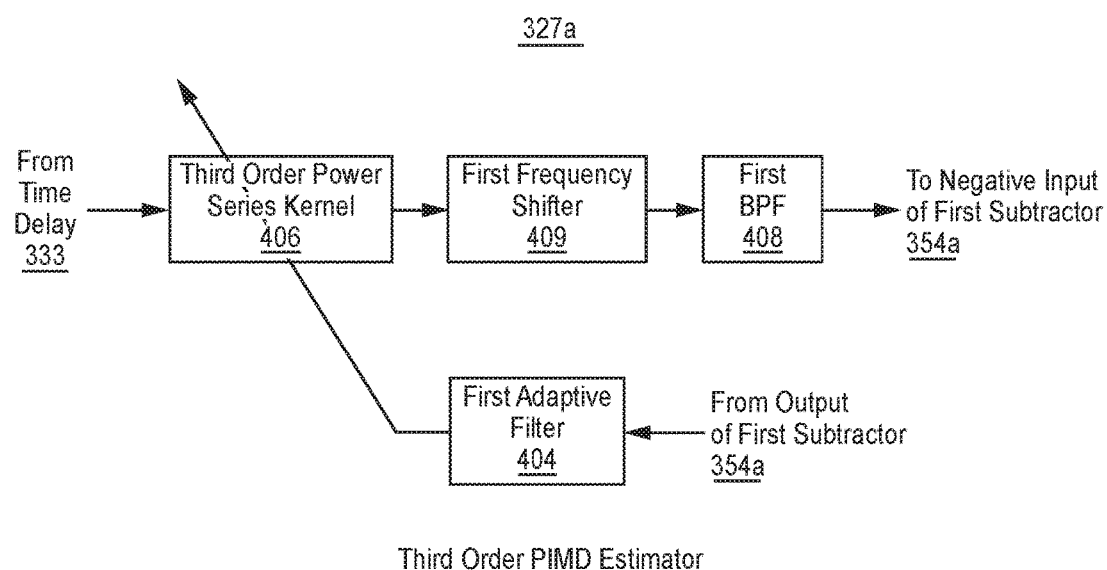
FIG. 4A illustrates an exemplary third order PIMD product estimator with a third order power series kernel.

The PIMD product estimators will now be described. FIG. 4A illustrates an exemplary third order PIMD product estimator with a third order power series kernel 400A. The third order PIMD product estimator with a third order power series kernel 400A comprises a third order power series kernel 406, a first bandpass filter (BPF) 408, a first frequency shifter 409, and a first adaptive filter 404. In one embodiment, the third order power series kernel 406 is a third order truncated Volterra series kernel.

A first input of the third order power series kernel 406 is coupled to an output of the time delay 333, and configured to receive the time delayed, upsampled downlink baseband modulated signal 396. A second input of the third order power series kernel 406 is coupled to an output of the first adaptive filter 404. The output of the third order power series kernel 406 is coupled to an input of the first frequency shifter 409. The output of the first frequency shifter 409 is coupled to an input of the first bandpass filter 408. The output of the first bandpass filter 408 is coupled to a negative input of the first subtractor 354a. In one embodiment, the first adaptive filter 404 is either a least mean squares filter or a recursive least squares filter. In another embodiment, the first adaptive filter maximizes the correlation between the estimated third order PIMD product and the actual third order PIMD product.

Figure 4B:
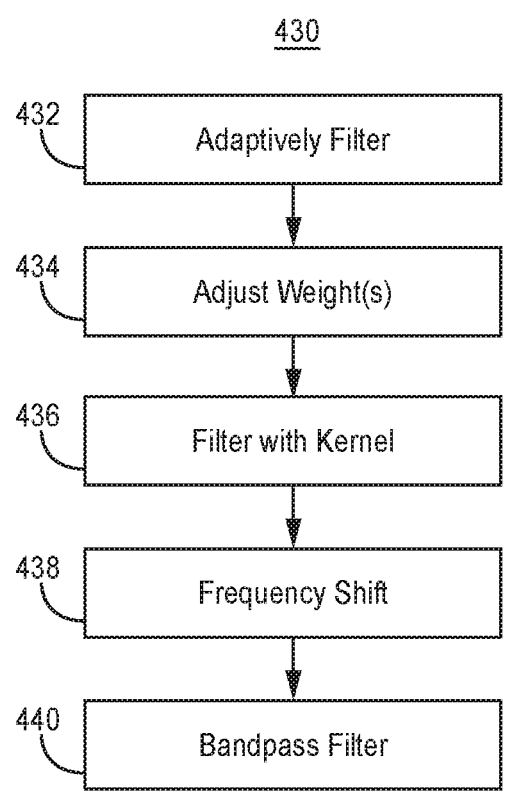
FIG. 4B illustrates an exemplary method of operation of a PIMD product estimator.

FIG. 4B illustrates an exemplary method of operation 430 of a PIMD product estimator. More specifically, the operation of the third order PIMD product estimator with a third order power series kernel 327a will now be described. However, the operation is applicable to all PIMD product estimators.

In block 432, adaptively filter the first filtered signal 392a, e.g. with the first adaptive filter 404. In block 434, based upon the adaptive filtering, adjust one or more weights, or coefficients, e.g. in the third order power series kernel 406. In one embodiment, the weights are updated on a sample by sample basis. In block 436, filter the time delayed, upsampled downlink baseband modulated signal 396, e.g. with the third order power series kernel 406.

In block 438, frequency shift, or translate the filtered, upsampled downlink baseband modulated signal provided by the third order power series kernel 416, to frequency $f_{center}$, e.g. by the first frequency shifter 409. In one embodiment, the frequency shift equals the difference in frequency between the actual third order PIMD product (prior to downconversion) and carrier frequency of the uplink passband modulated signal 321. In another embodiment, such frequency translation can be performed by a time-domain complex multiplication of $f_{center}$ with the corresponding power series, e.g. truncated Volterra series, kernel output.

In block 440, bandpass filter the frequency shifted, filtered, time delayed, upsampled downlink baseband modulated signal, e.g. generating the estimated first PIMD product 390a. Bandpass filtering is performed to ensure only the desire PIMD product is generated. The foregoing process operates sample to sample at the upsampled rate to obtain an accurate estimated first PIMD product 390a.

Figure 5A:
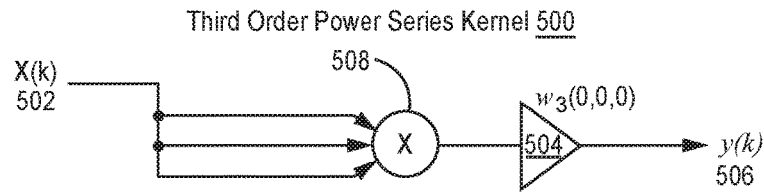
FIG. 5A illustrates an exemplary third order power series kernel.

FIG. 5A illustrates an exemplary third order power series kernel 500 solely for the purpose of distinguishing between a power series kernel and a truncated Volterra series kernel. The third order power series kernel 500 has an input (x(k)) 502, weight $w_3(0,0,0)$ 504, a multiplier 508, and output (y(k)) 506. The input 502 is cubed by the multiplier 508. The output 506 is the weight $w_3(0,0,0)$ 504 multiplied by the cube, or $x^3(k)$, of input 502. For power series kernels, weights, like $w_3(0,0,0)$ 504, are adjusted by an adaptive filter 404.

Figure 5B:
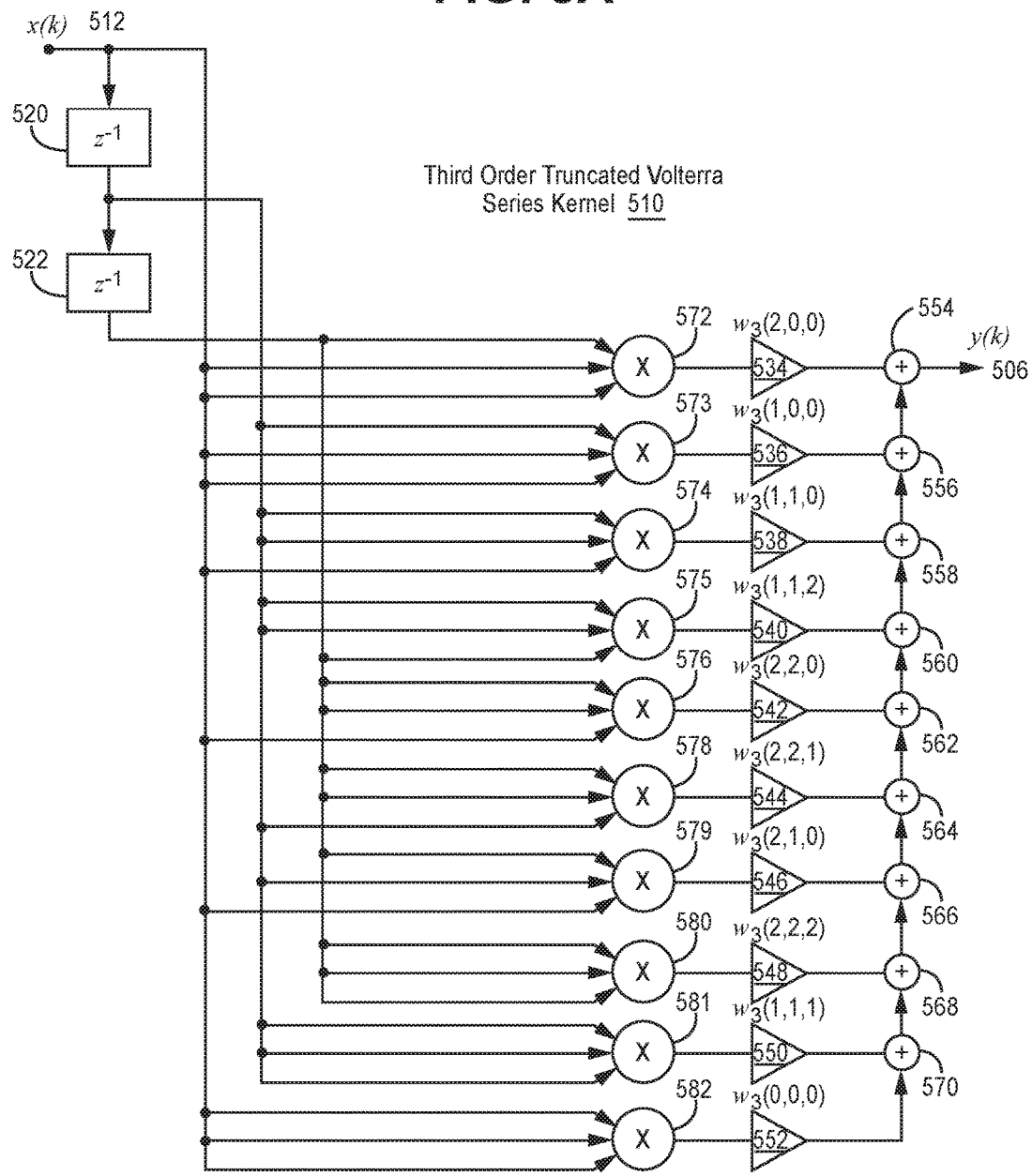
FIG. 5B illustrates an exemplary third order truncated Volterra series kernel.

FIG. 5B illustrates an exemplary third order truncated Volterra series kernel 510. A Volterra series is a type of power series, but with memory represented by time delays, that can be used to model nonlinear systems. Ideally, a Volterra series is infinite, however, that would be impractical for signal processing. Therefore, in the illustrated embodiment, is 'truncated' to ten cubic terms each having respectively no delay, one unit of delay, two units of delay or a combination of the three possible unit delays. The third order truncated Volterra series kernel 510 has an input (x(k)) 512, weights $w_3(0,0,0)$ 552, $w_3(1,1,1)$ 550, $w_3(2,2,2)$ 548, $w_3(2,1,0)$ 546, $w_3(2,2,1)$ 544, $w_3(2,2,0)$ 542, $w_3(1,1,2)$ 540, $w_3(1,1,0)$ 538, $w_3(1,0,0)$ 536, and $w_3(2,0,0)$ 534, a first time delay $(z_1^{-1})$ 520, a second time delay $(z_2^{-1})$ 522, a first summer 554, a second summer 556, a third summer 558, a fourth summer 560, a fifth summer 562, a sixth summer 564, a seventh summer 566, an eighth summer 568, and a ninth summer 570, a first multiplier 572, a second multiplier 573, a third multiplier 574, a fourth multiplier 575, a fifth multiplier 576, a sixth multiplier 578, a seventh multiplier 579, an eighth multiplier 580, a ninth multiplier 581, and a tenth multiplier 582, and output (y(k)) 506. Thus, the output 506 is the sum of weighted cubic terms of the input 512 subject to ten different combinations of no delay, one unit delay, two units of delay or a combination of the three. In one embodiment, each truncated Volterra series kernel is truncated so as to have only five or less time delays. The number of time delays in the truncated Volterra series kernels is selected by the designer of the BBU with PIM cancellation 300 who make a determination based upon the accuracy of the corresponding estimated PIMD products, and as a result the ability of the PIMD products canceller 324A to remove the undesired PIMD products.

Returning to FIG. 3A, the PIMD products canceller 324A includes one through n+1 PIMD sensors, and one through n PIMD estimators. The first one through n PIMD sensors are coupled to the positive inputs of corresponding first through nth subtractors. The n+1th PIMD sensor 350n+1 is coupled to the output of the last, nth subtractor 354n. As discussed above, the PIMD sensors generate signals indicative of the level of distortion in the correspondingly measured signals. As discussed above, the PIMD estimators generates a signal indicative of the level PIMD at the output of the PIMD product estimators to which the PIMD estimators are coupled.

In one embodiment, the outputs, of the PIMD sensors and the PIMD estimators, are coupled to inputs of the switch logic 317. In another embodiment, the PIMD sensors and the PIMD estimators are located elsewhere, e.g. in the switch logic 317.

Figure 6:
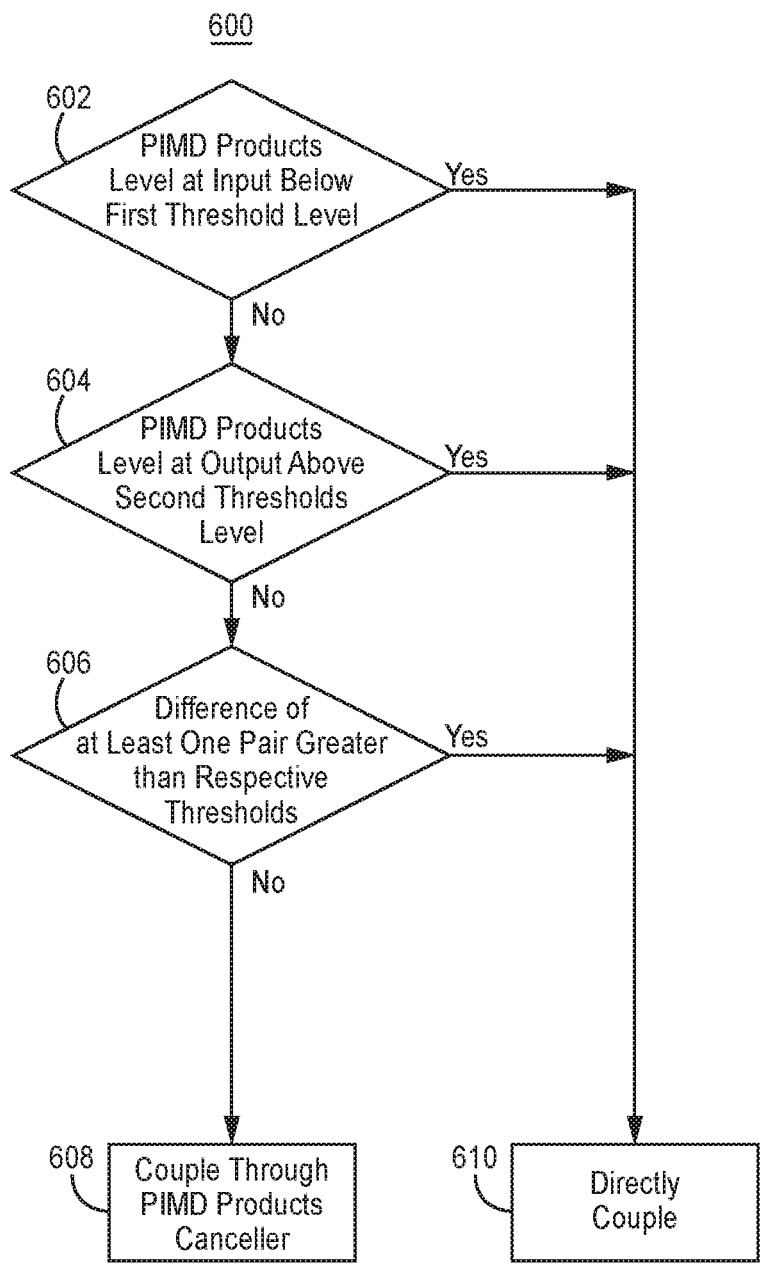
FIG. 6 illustrates an exemplary method of operation of switch logic.

FIG. 6 illustrates an exemplary method 600 of operation of switch logic 317. In one embodiment, the switch logic 317 ascertains if the PIMD products canceller 324A is needed, and thus used, and if used, whether the PIMD products canceller 324A is satisfactorily reducing PIMD in the uplink path 312. In another embodiment, if the PIMD products canceller 324A is not satisfactorily reducing PIMD in the uplink path 312, the switch logic 317 commands the PIMD products canceller system 310A, e.g. the switch 316, to bypass the PIMD products canceller 324A. Thus, in a further embodiment, the switch logic 317 ascertains whether to couple the input of the uplink IQ demodulator 306 to the output of the PIMD products canceller 324A, or directly to the output of the direct downconverter 320.

In one embodiment, PAPR is measured to determine PIMD, or distortion, level. Further, the levels of PAPR generated from a PIMD sensor and a corresponding PIMD estimator should be correlated.

In one embodiment, in block 602 determine if the distortion level (e.g. measured at by PIMD sensor 350a) at an input of the PIMD products canceller 324A, is less than a first threshold level. In another embodiment, the distortion level is measured in the uplink baseband modulated signal 320, or the upsampled, uplink baseband modulated signal 394. If yes, then PIMD product cancellation is not necessary, and then, in block 610, directly couple the input of uplink IQ demodulator 306 to the output of the direct downconverter 320. In a further embodiment, this is accomplished by the switch logic 317 commanding the switch 316 to set the proper position of the switch 316. As a result, the PIMD products canceller 324A is bypassed.

If no, then in one embodiment, in block 604 determine if the distortion level at an output of the PIMD products canceller 324A, e.g. at the input or output of the downsampler 325, is greater than a second threshold level. If yes, then PIMD product cancellation is not adequately suppressing PIMD products, and then, in block 610, directly couple the input of uplink IQ demodulator 306 to the output of the direct downconverter 320. In one embodiment, this outcome indicates that the PIMD products canceller 324A is unable to adequately remove PIMD products. In a further embodiment, this is accomplished by the switch logic 317 commanding the switch 316 to set the proper position of the switch 316. As a result, the PIMD products canceller 324A is bypassed.

If no, then in one embodiment, in block 606 determine if the differences of distortion levels between one or more pairs of corresponding upsampled, uplink baseband modulated signal 320 and/or filtered signals, and estimated PIMD products is greater than respective thresholds in a set of one or more corresponding threshold level(s).

Examples of such pairs are:
(a) upsampled, uplink baseband modulated signal 320 and estimated third order PIMD product 390a; and
(b) n−1 filtered signal 392n−1 and estimated Nth order PIMD product 390n.

If yes, then individual PIMD estimators are not properly converging and suppressing PIMD products, and then, in block 610, directly couple the input of uplink IQ demodulator 306 to the output of the direct downconverter 320, i.e. the uplink baseband modulated signal 320. In another embodiment, this outcome indicates that the PIMD products canceller 324A is unable to adequately remove one or more PIMD products. In a further embodiment, this is accomplished by the switch logic 317 commanding the switch 316 to set the proper position of the switch 316. As a result, the PIMD products canceller 324A is bypassed.

If no, then, in block 608, couple the input of uplink IQ demodulator 306 to the output of the direct downconverter 320 through the PIMD products canceller 324A. In one embodiment, the foregoing threshold levels are selected by the designer of the BBU with PIM cancellation 300 or the architect of the communications network employing the transceiver system including PIM cancellation 100 based upon the maximum level of PIMD products that can be tolerated by the transceiver system including PIMD products cancellation 100.

The methods and techniques described here may be implemented in digital electronic circuitry, e.g. a state machine, or with a programmable processor (for example, a special-purpose processor, e.g. a digital signal processor, or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

Example 1 includes a method for diminishing passive intermodulation (PIM), the method comprising: upsampling an uplink baseband modulated signal; upsampling a downlink baseband modulated signal; determining a time delay for the upsampled downlink baseband modulated signal; time delaying the upsampled downlink baseband modulated signal by the determined time delay; estimating a third order PIM distortion (PIMD) product by filtering the time delayed, upsampled downlink baseband modulated signal with a third order power series kernel; generating a first filtered signal by subtracting the estimated third order PIMD product from the upsampled uplink baseband modulated signal; estimating a Nth order PIMD product by filtering the time delayed, upsampled downlink baseband modulated signal with a Nth order power series kernel; generating a nth filtered signal by subtracting the estimated Nth order PIMD product from the n−1th filtered signal; and downsampling the nth filtered signal.

Example 2 includes the method of Example 1, wherein estimating the third order PIMD product by filtering the time delayed, upsampled downlink baseband modulated signal with the third order power series kernel comprises estimating the third order PIMD product by filtering the time delayed, upsampled downlink baseband modulated signal with a third order truncated Volterra series kernel; and wherein estimating the Nth order PIMD product by filtering the time delayed, upsampled downlink baseband modulated signal with the Nth order power series kernel comprises estimating the Nth order PIMD product by filtering the time delayed, upsampled downlink baseband modulated signal with a Nth order truncated Volterra series kernel.

Example 3 includes the method of any of Examples 1-2, further comprising estimating a fifth order PIMD product by filtering the time delayed, upsampled downlink baseband modulated signal with a fifth order power series kernel; generating a second filtered signal by subtracting the estimated fifth order PIMD product from the first filtered signal; wherein estimating the Nth order PIMD product by filtering the time delayed, upsampled downlink baseband modulated signal with the Nth order power series kernel comprises estimating a seventh order PIMD product by filtering the time delayed, upsampled downlink baseband modulated signal with a seventh order power series kernel; and wherein generating the nth filtered signal by subtracting the estimated Nth order PIMD product from the n−1th filtered signal comprises generating a third filtered signal by subtracting the estimated seventh order PIMD from the second filtered signal.

Example 4 includes the method of Example 3, wherein estimating the third order PIMD product by filtering the time delayed, upsampled downlink baseband modulated signal with the third order power series kernel comprises estimating the third order PIMD product by filtering the time delayed, upsampled downlink baseband modulated signal with a third order truncated Volterra series kernel; wherein estimating the fifth order PIMD product by filtering the time delayed, upsampled downlink baseband modulated signal with the fifth order power series kernel comprises estimating the fifth order PIMD product by filtering the time delayed, upsampled downlink baseband modulated signal with a fifth order truncated Volterra series kernel; and wherein estimating the seventh order PIMD product by filtering the time delayed, upsampled downlink baseband modulated signal with the seventh order power series kernel comprises estimating the seventh order PIMD product by filtering the time delayed, upsampled downlink baseband modulated signal with a seventh order truncated Volterra series kernel.

Example 5 includes the method of any of Examples 1-4, determining the time delay for the upsampled downlink baseband modulated signal comprises: determining a coarse time delay with the downlink baseband modulated signal and the uplink baseband modulated signal; and finely adjusting the coarse delay time based upon a difference in a level of distortion of the upsampled uplink baseband modulated signal and a level of distortion of at least one of the estimated PIMD products.

Example 6 includes the method of Example 5, wherein finely adjusting the coarse delay time based upon the difference in the level of distortion of the upsampled uplink baseband modulated signal and the level of distortion of at least one of the estimated PIMD products comprises finely adjusting the coarse delay time based upon the difference in the level of distortion of the upsampled uplink baseband modulated signal and the level of distortion of the estimated third order PIMD product.

Example 7 includes the method of any of Examples 1-6, wherein estimating the third order PIMD product by filtering the time delayed, upsampled downlink baseband modulated signal with the third order power series kernel comprises: adjusting at least one weight of the third order power series kernel based upon adaptively filtering the first filtered signal; filtering the time delayed, upsampled downlink baseband modulated signal with the third order power series kernel;

frequency shifting the filtered, time delayed, upsampled downlink baseband modulated signal; bandpass filtering the filtered, time delayed, upsampled downlink baseband modulated signal; and wherein estimating the Nth order PIMD product by filtering the time delayed, upsampled downlink baseband modulated signal with the Nth order power series kernel comprises: adjusting at least one weight of the Nth order power series kernel based upon adaptively filtering the nth filtered signal; filtering the time delayed, upsampled downlink baseband modulated signal with the Nth order power series kernel; frequency shifting the filtered, time delayed, upsampled downlink baseband modulated signal; and bandpass filtering the frequency shifted, filtered, time delayed, upsampled downlink baseband modulated signal.

Example 8 includes the method of Example 7, wherein adjusting at least one weight of the third order power series kernel based upon adaptively filtering the first filtered signal comprises adjusting at least one weight of a third order truncated Volterra series kernel based upon adaptively filtering the first filtered signal; wherein filtering the time delayed, upsampled downlink baseband modulated signal with the third order power series kernel comprises filtering the time delayed, upsampled downlink baseband modulated signal with the third order truncated Volterra series kernel; wherein adjusting at least one weight of the Nth order power series kernel based upon adaptively filtering the nth filtered signal comprises adjusting at least one weight of the Nth order truncated Volterra series kernel based upon adaptively filtering the nth filtered signal; and filtering the time delayed, upsampled downlink baseband modulated signal with the Nth order power series kernel comprises filtering the time delayed, upsampled downlink baseband modulated signal with the Nth order truncated Volterra series kernel.

Example 9 includes the method of any of Examples 1-8 further comprising directly coupling an uplink baseband modulated signal to a downlink demodulator if at least one of the following conditions occurs: a PIMD level at an input of a PIMD products canceller is less than a first threshold level; a PIMD level at an output of the PIMD products canceller is greater than a second threshold level; and the differences of PIMD levels between one or more pairs of corresponding upsampled uplink baseband modulated signal or filtered signals and estimated PIMD products is greater than one or more respective thresholds.

Example 10 includes a passive intermodulation distortion (PIMD) products cancellation system, comprising: a first upsampler; wherein the first upsampler is configured to upsample an uplink baseband modulated signal; a second upsampler; wherein the second upsampler is configured to upsample a downlink baseband modulated signal; a time aligner; wherein the time aligner is configured to determine an amount of time delay for the upsampled downlink baseband modulated signal; a time delay coupled to the time aligner and the second upsampler; wherein the time delay is configured to delay the upsampled downlink baseband modulated signal by the determined amount of time delay; a third order PIMD product estimator with a third order power series kernel coupled to the time delay; wherein the third order PIMD product estimator with the third order power series kernel is configured to generate an estimated third order PIMD product; a first subtractor; wherein the first subtractor is configured to generate a first filtered signal by subtracting the estimated third order PIMD product from the upsampled uplink baseband modulated signal; a Nth order PIMD product estimator with a Nth order power series kernel coupled to the time delay; wherein the Nth order PIMD product estimator with the Nth order power series kernel is configured to generate an estimated Nth order PIMD product; a nth subtractor coupled to the first subtractor; wherein the nth subtractor is configured to generate a nth filtered signal by subtracting the estimated Nth order PIMD product from a n−1th filtered signal; a downsampler; and wherein the downsampler is configured to downsample the nth filtered signal.

Example 11 includes the PIMD products cancellation system of Example 10, wherein the third order PIMD product estimator with a third order power series kernel is a third order PIMD product estimator with a third order truncated Volterra kernel; and wherein the Nth order PIMD product estimator with the Nth order power series kernel is a Nth order PIMD product estimator with a Nth order truncated Volterra kernel.

Example 12 includes the PIMD products cancellation system of any of Examples 10-11, further comprising: a fifth order PIMD product estimator with a fifth order power series kernel coupled to the time delay; wherein the fifth order PIMD product estimator with the fifth order power series kernel is configured to generate an estimated fifth order PIMD product; a second subtractor; wherein the second subtractor is configured to generate a second filtered signal by subtracting the estimated fifth order PIMD product from the first filtered signal; wherein the Nth order PIMD product estimator with the Nth order power series kernel comprises a seventh order PIMD product estimator with a seventh order power series kernel; wherein the nth subtractor comprises a third subtractor; and wherein the nth subtractor is configured to generate a nth filtered signal by subtracting the estimated Nth order PIMD product from a n−1th filtered signal comprises the third subtractor is configured to generate a third filtered signal by subtracting the estimated seventh order PIMD product from the second filtered signal.

Example 13 includes the PIMD products cancellation system of Example 12, wherein the third order PIMD product estimator with the third order power series kernel is a third order PIMD product estimator with a third order truncated Volterra kernel; wherein the fifth order PIMD product estimator with the fifth order power series kernel is a fifth order PIMD product estimator with a fifth order truncated Volterra kernel; and wherein the seventh order PIMD product estimator with the seventh order power series kernel is a seventh order PIMD product estimator with a seventh order truncated Volterra kernel.

Example 14 includes the PIMD products cancellation system of any of Examples 10-13, wherein the third order PIMD estimator comprises: a third order power series kernel having a first input coupled to an output of the time delay; a first frequency shifter coupled to the output of the third order power series kernel; a first bandpass filter coupled to an output of the first frequency shifter and a negative input of the first subtractor; and a first adaptive filter having an input coupled to an output of the first subtractor and an output coupled to a second input of the third order power series kernel; and wherein the Nth order PIMD estimator comprises: a Nth order power series kernel having a first input coupled to an output of the time delay; a nth frequency shifter coupled to the output of the Nth order power series kernel; a nth bandpass filter coupled to an output of the nth frequency shifter and a negative input of the nth subtractor; and a nth adaptive filter having an input coupled to an output of the nth subtractor and an output coupled to a second input of the Nth order power series kernel.

Example 15 includes the PIMD products cancellation system of any of Examples 10-14, wherein the time aligner comprises: a coarse time aligner; wherein the coarse time aligner is configured to receive the downlink baseband modulated signals and the uplink baseband modulated signals; a fine time aligner; and wherein the fine time aligner is configured to receive a level of distortion of the upsampled uplink baseband modulated signal and a level of distortion of at least one of the estimated PIMD products.

Example 16 includes the PIMD products cancellation system of Example 15, wherein the fine time aligner is configured to receive a level of distortion in the upsampled uplink baseband modulated signal and the level of distortion of at least one of the estimated PIMD products comprises the fine time aligner is configured to receive the level of distortion of the upsampled uplink baseband modulated signal and a level of distortion of a third order estimated PIMD product.

Example 17 includes the PIMD products cancellation system of any of Examples 10-16, further comprising: a switch coupled to the downsampler; switch logic coupled to the switch; and wherein the switch logic is configured to receive levels of distortion of one or more of the following: the upsampled uplink baseband modulated signal, one or more filtered signals, and one or more estimated PIMD products.

Example 18 includes a system, comprising: at least one antenna; a remote radio head coupled to the at least one antenna; a baseband unit with passive intermodulation distortion (PIMD) cancellation coupled to the remote radio head; a base station controller coupled to the baseband unit; and wherein the baseband unit with PIMD cancellation comprises: a first upsampler; wherein the first upsampler is configured to upsample an uplink baseband modulated signal; a second upsampler; wherein the second upsampler is configured to upsample a downlink baseband modulated signal; a time aligner; wherein the time aligner is configured to determine an amount of time delay for the upsampled downlink baseband modulated signal; a time delay coupled to the time aligner and the second upsampler; wherein the time delay is configured to delay the upsampled downlink baseband modulated signal by the determined amount of time delay; a third order PIMD product estimator with a third order power series kernel coupled to the time delay; wherein the third order PIMD product estimator with the third order power series kernel is configured to generate an estimated third order PIMD product; a first subtractor; wherein the first subtractor is configured to generate a first filtered signal by subtracting the estimated third order PIMD product from the upsampled downlink baseband modulated signal; a Nth order PIMD product estimator with a Nth order power series kernel coupled to the time delay; wherein the Nth order PIMD product estimator with the Nth order power series kernel is configured to generate an estimated Nth order PIMD product; a nth subtractor; wherein the nth subtractor is configured to generate a nth filtered signal by subtracting the estimated Nth order PIMD product from a n−1th filtered signal; a downsampler; and wherein the downsampler is configured to downsample the nth filtered signal.

Example 19 includes the PIMD products cancellation system of Example 18, wherein the third order PIMD product estimator with the third order power series kernel is a third order PIMD product estimator with a third order truncated Volterra kernel; and wherein the Nth order PIMD product estimator with the Nth order power series kernel is a Nth order PIMD product estimator with a Nth order truncated Volterra kernel.

Example 20 includes the PIMD products cancellation system of any of Examples 18-19, wherein the time aligner comprises: a coarse time aligner; wherein the coarse time aligner is configured to receive the downlink baseband modulated signal and the uplink baseband modulated signal; a fine time aligner; and wherein the fine time aligner is configured to receive a level of distortion of the upsampled baseband modulated signal and a level of distortion of at least one of the estimated PIMD products.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A method for diminishing passive intermodulation distortion (PIMP) products, the method comprising:
   upsampling an uplink baseband modulated signal;
   upsampling a downlink baseband modulated signal;
   determining a time delay for the upsampled downlink baseband modulated signal;
   time delaying the upsampled downlink baseband modulated signal by the determined time delay;
   estimating a third order PIMD product by filtering the time delayed, upsampled downlink baseband modulated signal with a third order power series kernel;
   generating a first filtered signal by subtracting the estimated third order PIMD product from the upsampled uplink baseband modulated signal;
   estimating a Nth order PIMD product by filtering the time delayed, upsampled downlink baseband modulated signal with a Nth order power series kernel, where N is an odd integer greater than three;
   generating a nth filtered signal by subtracting the estimated Nth order PIMD product from a n 1th filtered signal, where n is a number of PIMD estimators; and
   downsampling the nth filtered signal.

2. The method of claim 1, wherein estimating the third order PIMD product by filtering the time delayed, upsampled downlink baseband modulated signal with the third order power series kernel comprises estimating the third order PIMD product by filtering the time delayed, upsampled downlink baseband modulated signal with a third order truncated Volterra series kernel; and
   wherein estimating the Nth order PIMD product by filtering the time delayed, upsampled downlink baseband modulated signal with the Nth order power series kernel comprises estimating the Nth order PIMD product by filtering the time delayed, upsampled downlink baseband modulated signal with a Nth order truncated Volterra series kernel.

3. The method of claim 1, further comprising
   estimating a fifth order PIMD product by filtering the time delayed, upsampled downlink baseband modulated signal with a fifth order power series kernel; and
   generating a second filtered signal by subtracting the estimated fifth order PIMD product from the first filtered signal;
   wherein estimating the Nth order PIMD product by filtering the time delayed, upsampled downlink baseband modulated signal with the Nth order power series kernel comprises estimating a seventh order PIMD product by filtering the time delayed, upsampled downlink baseband modulated signal with a seventh order power series kernel; and
   wherein generating the nth filtered signal by subtracting the estimated Nth order PIMD product from the n−1th filtered signal comprises generating a third filtered signal by subtracting the estimated seventh order PIMD product from the second filtered signal.

4. The method of claim 3, wherein estimating the third order PIMD product by filtering the time delayed, upsampled downlink baseband modulated signal with the third order power series kernel comprises estimating the third order PIMD product by filtering the time delayed, upsampled downlink baseband modulated signal with a third order truncated Volterra series kernel;

wherein estimating the fifth order PIMD product by filtering the time delayed, upsampled downlink baseband modulated signal with the fifth order power series kernel comprises estimating the fifth order PIMD product by filtering the time delayed, upsampled downlink baseband modulated signal with a fifth order truncated Volterra series kernel; and wherein estimating the seventh order PIMD product by filtering the time delayed, upsampled downlink baseband modulated signal with the seventh order power series kernel comprises estimating the seventh order PIMD product by filtering the time delayed, upsampled downlink baseband modulated signal with a seventh order truncated Volterra series kernel.

5. The method of claim 1, determining the time delay for the upsampled downlink baseband modulated signal comprises:

determining a coarse time delay with the downlink baseband modulated signal and the uplink baseband modulated signal; and finely adjusting the coarse time delay based upon a difference in a level of distortion of the upsampled uplink baseband modulated signal and a level of distortion of at least one of the estimated PIMD products.

6. The method of claim 5, wherein finely adjusting the coarse time delay based upon the difference in the level of distortion of the upsampled uplink baseband modulated signal and the level of distortion of at least one of the estimated PIMD products comprises finely adjusting the coarse time delay based upon the difference in the level of distortion of the upsampled uplink baseband modulated signal and the level of distortion of the estimated third order PIMD product.

7. The method of claim 1, wherein estimating the third order PIMD product by filtering the time delayed, upsampled downlink baseband modulated signal with the third order power series kernel comprises:

adjusting at least one weight of the third order power series kernel based upon adaptively filtering the first filtered signal;

filtering the time delayed, upsampled downlink baseband modulated signal with the third order power series kernel;

frequency shifting the filtered, time delayed, upsampled downlink baseband modulated signal; and bandpass filtering the frequency shifted, filtered, time delayed, upsampled downlink baseband modulated signal; and wherein estimating the Nth order PIMD product by filtering the time delayed, upsampled downlink baseband modulated signal with the Nth order power series kernel comprises:

adjusting at least one weight of the Nth order power series kernel based upon adaptively filtering the nth filtered signal;

filtering the time delayed, upsampled downlink baseband modulated signal with the Nth order power series kernel;

frequency shifting the filtered, time delayed, upsampled downlink baseband modulated signal; and bandpass filtering the frequency shifted, filtered, time delayed, upsampled downlink baseband modulated signal.

8. The method of claim 7, wherein adjusting at least one weight of the third order power series kernel based upon adaptively filtering the first filtered signal comprises adjusting at least one weight of a third order truncated Volterra series kernel based upon adaptively filtering the first filtered signal;

wherein filtering the time delayed, upsampled downlink baseband modulated signal with the third order power series kernel comprises filtering the time delayed, upsampled downlink baseband modulated signal with the third order truncated Volterra series kernel;

wherein adjusting at least one weight of the Nth order power series kernel based upon adaptively filtering the nth filtered signal comprises adjusting at least one weight of a Nth order truncated Volterra series kernel based upon adaptively filtering the nth filtered signal; and filtering the time delayed, upsampled downlink baseband modulated signal with the Nth order power series kernel comprises filtering the time delayed, upsampled downlink baseband modulated signal with the Nth order truncated Volterra series kernel.

9. The method of claim 1 further comprising cease providing the downsampled nth filtered signal if at least one of the following conditions occurs:

a PIMD level of the uplink baseband modulated signal is less than a first threshold level;

a PIMD level of the downsampled nth filtered signal is greater than a second threshold level; and the differences of PIMD levels between one or more pairs of corresponding upsampled uplink baseband modulated signal or filtered signals and estimated PIMD products is greater than one or more respective thresholds.

10. A passive intermodulation distortion (PIMD) products cancellation system, comprising:

a first upsampler configured to upsample an uplink baseband modulated signal;

a second upsampler configured to upsample a downlink baseband modulated signal;

a time aligner configured to determine an amount of time delay for the upsampled downlink baseband modulated signal;

a time delay coupled to the time aligner and the second upsampler, wherein the time delay is configured to delay the upsampled downlink baseband modulated signal by the determined amount of time delay;

a third order PIMD product estimator with a third order power series kernel coupled to the time delay, wherein the third order PIMD product estimator is configured to generate an estimated third order PIMD product;

a first subtractor configured to generate a first filtered signal by subtracting the estimated third order PIMD product from the upsampled uplink baseband modulated signal;

a Nth order PIMD product estimator with a Nth order power series kernel coupled to the time delay, wherein the Nth order PIMD product estimator is configured to generate an estimated Nth order PIMD product, where N is an odd integer greater than three;
a nth subtractor coupled to the first subtractor,
wherein the nth subtractor is configured to generate a nth filtered signal by subtracting the estimated Nth order PIMD product from a n−1th filtered signal,
where n is a number of PIMD estimators; and
a downsampler
configured to downsample the nth filtered signal.

11. The PIMD products cancellation system of claim 10, wherein the third order PIMD product estimator with the third order power series kernel is the third order PIMD product estimator with a third order truncated Volterra kernel; and
wherein the Nth order PIMD product estimator with the Nth order power series kernel is the Nth order PIMD product estimator with a Nth order truncated Volterra kernel.

12. The PIMD products cancellation system of claim 10, further comprising:
a fifth order PIMD product estimator with a fifth order power series kernel coupled to the time delay,
wherein the fifth order PIMD product estimator is configured to generate an estimated fifth order PIMD product;
a second subtractor configured to generate a second filtered signal by subtracting the estimated fifth order PIMD product from the first filtered signal;
wherein the Nth order PIMD product estimator with the Nth order power series kernel comprises a seventh order PIMD product estimator with a seventh order power series kernel;
wherein the seventh order PIMD product estimator is configured to generate an estimated seventh order PIMD product;
wherein the nth subtractor comprises a third subtractor; and
wherein the third subtractor is configured to generate a third filtered signal by subtracting the estimated seventh order PIMD product from the second filtered signal.

13. The PIMD products cancellation system of claim 12, wherein the third order PIMD product estimator with the third order power series kernel is the third order PIMD product estimator with a third order truncated Volterra kernel;
wherein the fifth order PIMD product estimator with the fifth order power series kernel is the fifth order PIMD product estimator with a fifth order truncated Volterra kernel; and
wherein the seventh order PIMD product estimator with the seventh order power series kernel is the seventh order PIMD product estimator with a seventh order truncated Volterra kernel.

14. The PIMD products cancellation system of claim 10, wherein the third order PIMD estimator comprises:
The third order power series kernel having a first input coupled to an output of the time delay;
a first frequency shifter coupled to an output of the third order power series kernel;
a first bandpass filter coupled to an output of the first frequency shifter and a negative input of the first subtractor; and
a first adaptive filter having an input coupled to an output of the first subtractor and an output coupled to a second input of the third order power series kernel; and wherein the Nth order PIMD estimator comprises:
the Nth order power series kernel having a first input coupled to the output of the time delay;
a nth frequency shifter coupled to an output of the Nth order power series kernel;
a nth bandpass filter coupled to an output of the nth frequency shifter and a negative input of the nth subtractor; and
a nth adaptive filter having an input coupled to an output of the nth subtractor and an output coupled to a second input of the Nth order power series kernel.

15. The PIMD products cancellation system of claim 10, wherein the time aligner comprises:
a coarse time aligner
configured to receive the downlink baseband modulated signals and the uplink baseband modulated signals; and
a fine time aligner
configured to receive a level of distortion of the upsampled uplink baseband modulated signal and a level of distortion of at least one of the estimated PIMD products.

16. The PIMD products cancellation system of claim 15, wherein the fine time aligner is further configured to receive the level of distortion of the upsampled uplink baseband modulated signal and a level of distortion of the estimated third order PIMD product.

17. The PIMD products cancellation system of claim 10, further comprising:
a switch coupled to the downsampler; and
switch logic coupled to the switch,
wherein the switch logic is configured to receive levels of distortion of one or more of the following: the upsampled uplink baseband modulated signal, one or more filtered signals, and one or more estimated PIMD products.

18. A system, comprising:
at least one antenna;
a remote radio head coupled to the at least one antenna;
a baseband unit with a passive intermodulation distortion (PIMD) canceler coupled to the remote radio head;
a base station controller coupled to the baseband unit; and
wherein the baseband unit with the PIMD canceler comprises:
a first upsampler configured to upsample an uplink baseband modulated signal;
a second upsampler configured to upsample a downlink baseband modulated signal;
a time aligner configured to determine an amount of time delay for the upsampled downlink baseband modulated signal;
a time delay coupled to the time aligner and the second upsampler,
wherein the time delay is configured to delay the upsampled downlink baseband modulated signal by the determined amount of time delay;
a third order PIMD product estimator with a third order power series kernel coupled to the time delay,
wherein the third order PIMD product estimator with the third order power series kernel is configured to generate an estimated third order PIMD product;
a first subtractor configured to generate a first filtered signal by subtracting the estimated third order PIMD product from the upsampled downlink baseband modulated signal;
a Nth order PIMD product estimator with a Nth order power series kernel coupled to the time delay, wherein the Nth order PIMD product estimator with the Nth order power series kernel is configured to generate an estimated Nth order PIMD product, where N is an odd integer greater than three;

a nth subtractor configured to generate a nth filtered signal by subtracting the estimated Nth order PIMD product from a n−1th filtered signal, where n is a number of PIMD estimators, and a downsampler configured to downsample the nth filtered signal.

19. The PIMD products cancellation system of claim 18, wherein the third order PIMD product estimator with the third order power series kernel is the third order PIMD product estimator with a third order truncated Volterra kernel; and wherein the Nth order PIMD product estimator with the Nth order power series kernel is the Nth order PIMD product estimator with a Nth order truncated Volterra kernel.

20. The PIMD products cancellation system of claim 18, wherein the time aligner comprises:

a coarse time aligner configured to receive the downlink baseband modulated signal and the uplink baseband modulated signal; and a fine time aligner configured to receive a level of distortion of the upsampled baseband modulated signal and a level of distortion of at least one of the estimated PIMD products.

* * * * *